UNITED STATES PATENT OFFICE.

CHRISTIAN H. RUDOLPH, OF HÖCHST-ON-THE-MAIN, GERMANY, ASSIGNOR TO FARBWERKE, VORMALS MEISTER, LUCIUS & BRÜNING, OF SAME PLACE.

PRODUCTION OF COLORING-MATTER.

SPECIFICATION forming part of Letters Patent No. 256,599, dated April 18, 1882.

Application filed January 5, 1882. (Specimens.)

*To all whom it may concern:*

Be it known that I, CHRISTIAN HEINRICH RUDOLPH, of Höchst-on-the-Main, Germany, have invented a new and useful Improvement in Coloring-Matter, of which the following is a specification.

My invention has for its object the production of a yellow coloring-matter by the action at a suitable temperature of a dehydrating agent on acetanilide with or without the addition of an aniline salt.

First. To obtain the coloring-matter I boil at a temperature of 446° to 482° Fahrenheit, (230° to 250° centigrade,) and for a space of time varying in accordance to the quantities of material worked upon. I boil, I say, a mixture of equal parts of acetanilide and chloride of zinc, or of one part of acetanilide, two parts of hydrochlorate of aniline, and two parts of chloride of zinc. After the action is completed I boil the reaction mass or melt with water. The base of the coloring-matter which remains undissolved I dissolve in diluted acids. From the thus obtained solution I precipitate the coloring-matter by an addition of common salt, and afterward I purify it by crystallization. From a solution of the coloring-matter a white base, crystallizing in long needles, is precipitated by an addition of alkalies. A light yellowish precipitate is formed by an addition of bromine to a watery solution of the coloring-matter.

Second. The methylated, ethylated, &c., derivatives of the coloring-matter are obtained by the action of chloride, bromide, or iodide of methyl, ethyl, &c., on the same or on the base contained in it.

What I claim as new, and desire to secure by Letters Patent, is—

A yellow coloring-matter having the characteristic properties herein mentioned, obtained from a mixture of acetanilide and hydrochlorate of aniline by heating the same in the presence of chloride of zinc or some other dehydrating agent, substantially as and for the purpose set forth.

In testimony whereof I have signed my name to this specification in the presence of two subscribing witnesses.

CHRISTIAN HEINRICH RUDOLPH.

Witnesses:
 JOSEF EUGEN REVERDY,
 FRANZ HASSLACHER.